US011206441B2

(12) United States Patent
Navarre et al.

(10) Patent No.: US 11,206,441 B2
(45) Date of Patent: Dec. 21, 2021

(54) AUTOMATED MEDIA PRODUCTION PIPELINE FOR GENERATING PERSONALIZED MEDIA CONTENT

(71) Applicant: DISNEY ENTERPRISES, INC., Burbank, CA (US)

(72) Inventors: Katharine S. Navarre, Santa Monica, CA (US); Jason Lewis, Cupertino, CA (US); Dionysius Mavromatis, Kirkland, WA (US); Adam Eivy, Seattle, WA (US); Sujal Shah, West Hartford, CT (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/683,178

(22) Filed: Nov. 13, 2019

(65) Prior Publication Data
US 2021/0144426 A1 May 13, 2021

(51) Int. Cl.
*H04N 21/266* (2011.01)
*H04N 21/234* (2011.01)
(Continued)

(52) U.S. Cl.
CPC ... *H04N 21/2668* (2013.01); *H04N 21/23424* (2013.01); *H04N 21/25841* (2013.01); *H04N 21/25891* (2013.01); *H04N 21/44204* (2013.01)

(58) Field of Classification Search
CPC ......... H04N 21/2668; H04N 21/23424; H04N 21/25841; H04N 21/25891; H04N 21/44204
(Continued)

(56) References Cited

U.S. PATENT DOCUMENTS 8,223,152 B2 7/2012 Kim
8,806,531 B1 8/2014 Ho et al.
(Continued)

FOREIGN PATENT DOCUMENTS

WO 97/08898 A1 3/1997
WO 00/62552 A2 10/2000

OTHER PUBLICATIONS

Extended European Search Report for application No. 20204912.8 dated Jan. 29, 2021.
(Continued)

*Primary Examiner* — Dominic D Saltarelli
(74) *Attorney, Agent, or Firm* — Artegis Law Group, LLP

(57) ABSTRACT

A generative media pipeline automatically creates a personalized media program that is customized to reflect the specific viewing preferences of at least one individual user. The generative media pipeline obtains user data indicating the viewing preferences associated with the user and optionally the viewing context of the user. A recommendation service within the generative media pipeline provides a set of content options that includes various types of media content corresponding to the viewing preferences. A recipe service within the generative media pipeline obtains a recipe that defines the logical structure of the personalized media program. The recipe service populates the recipe by executing one or more video processing functions with some or all media content included in the content options. The recipe service thereby generates a logically structured and polished personalized media program that is individually tailored to reflect the specific preferences of the user.

22 Claims, 7 Drawing Sheets

(51) Int. Cl.
*H04N 21/442* (2011.01)
*H04N 21/258* (2011.01)
*H04N 21/2668* (2011.01)

(58) Field of Classification Search
USPC .......................................................... 725/14
See application file for complete search history.

(56) References Cited

U.S. PATENT DOCUMENTS

| | | | |
|---|---|---|---|
| 8,937,685 B1 | 1/2015 | Ho et al. | |
| 9,386,351 B1 | 7/2016 | Ho et al. | |
| 9,781,458 B2 | 10/2017 | Ho | |
| 10,051,342 B1 | 8/2018 | Ho | |
| 10,091,438 B1 | 10/2018 | Ho et al. | |
| 10,194,186 B1 | 1/2019 | Ho | |
| 2010/0146542 A1* | 6/2010 | Weihs | H04N 21/2668 725/34 |
| 2013/0297054 A1 | 11/2013 | Ojanpera | |
| 2017/0316708 A1* | 11/2017 | Harb | G09B 5/06 |
| 2018/0004746 A1 | 1/2018 | Hedinsson et al. | |
| 2018/0096385 A1 | 4/2018 | Somaya et al. | |
| 2018/0356967 A1 | 12/2018 | Rasheed | |
| 2019/0020912 A1 | 1/2019 | Solaro et al. | |
| 2019/0076741 A1 | 3/2019 | Thompson et al. | |
| 2020/0120023 A1* | 4/2020 | Munson | H04L 65/4084 |
| 2020/0204861 A1* | 6/2020 | Loheide | H04N 21/8146 |
| 2020/0273072 A1* | 8/2020 | Green | G06Q 30/0261 |
| 2021/0084350 A1* | 3/2021 | Chandra | H04N 21/8541 |

OTHER PUBLICATIONS

Final Office Action received for U.S. Appl. No. 16/683,176, dated Jan. 1, 2021, 16 pages.
Non-Final Office Action received for U.S. Appl. No. 16/155,799, dated Jan. 25, 2021, 19 pages.
Office Action received for U.S. Appl. No. 16/683,176 dated Oct. 20, 2021, 34 pages.

* cited by examiner

232

410
NAME : TEASER
MEDIA PROCESSING FUNCTIONS : F1, F2
FUNCTION PARAMETERS : C1, C2, C3

412
NAME : AD SLOT
FILE : URL1

414
NAME : MAIN CONTENT
SELECTION CRITERIA:
- SOURCE: LOCATION 1
- PLOT TYPE: NARRATIVE
- DURATION 60 - 180 SECONDS
- SENTIMENT: NEUTRAL - POSITIVE
- ENERGY LEVEL: MID - HIGH

MEDIA PROCESSING FUNCTIONS : F3, F4
FUNCTION PARAMETERS : C1, C2, P1, P2

416
NAME : AD SLOT
FILE : URL2

418
NAME : CLOSING CONTENT
SELECTION CRITERIA:
- SOURCE: LOCATION 2
- PLOT TYPE: CONCLUSION
- DURATION 60 - 120 SECONDS
- SENTIMENT: POSITIVE
- ENERGY LEVEL: LOW

FUNCTION : F5
PARAMETERS : C3, P3

FIG. 5

AUTOMATED MEDIA PRODUCTION PIPELINE FOR GENERATING PERSONALIZED MEDIA CONTENT

BACKGROUND

Field of the Various Embodiments

The various embodiments relate generally to computer science and media production and, more specifically, to an automated media production pipeline for generating personalized media content.

Description of the Related Art

A media production pipeline typically involves multiple production teams that work in conjunction with one another to create a media program. For example, when creating a live-action media program, one production team could work with a group of actors to capture raw media content, including raw audio content and/or raw visual content, and another production team could edit and refine the raw media content to create media clips and then combine those media clips to create the media program. Depending on the type of media program being created, different types of production teams may be needed. For example, when creating a computer-animated media program, a first production team could work with a team of voice actors to capture raw audio content, while a second production team could use computer animation tools to generate and render computer-animated media clips. Subsequently, a third production team could edit and combine the raw audio content with the computer-animated media clips to generate the computer-animated media program.

The amount of time and effort involved with implementing a media production pipeline typically prohibits media programs from being personalized to appeal to the specific preferences of a smaller subset of viewers or a single viewer. Accordingly, media programs are usually created to appeal to a broad demographic of viewers. However, viewers within particular demographics may have different interests and therefore, may find portions of media programs that target broader demographics to be uninteresting or irrelevant. For example, a sports program designed to appeal to sports enthusiasts could include one segment that provides information about football and another segment that provides information about basketball, but pure basketball fans could find the football segment uninteresting, while pure football fans could find the basketball segment uninteresting.

In an attempt to address the above issues, various recommendation engines have been developed that are configured to identify and recommend specific media content that may be relevant to specific viewers. For example, a recommendation engine could be configured to recommend a selection of football-oriented media clips to pure football fans and a selection of basketball-oriented media clips to pure basketball fans. However, recommendation engines suffer from certain technical drawbacks.

First, recommendation engines usually do not generate media programs that adhere to logical structures. Instead, recommendation engines typically do nothing more than simply recommend selections of different media clips to viewers. The media clips normally are presented in order of relevance, but, notably, the presentation of the media clips does not adhere to any logical flow or story arc, as is typically found with media programs that are created using conventional media production pipelines. Some viewers may find the lack of logical structure undesirable. Second, recommendation engines usually cannot generate the equivalent of a media program that plays back seamlessly for the viewer. Instead, the media clips recommended to a viewer by a recommendation engine have to be played back in disconnected segments with playback gaps occurring in between different media clips. Although the content of these media clips may be highly interesting to a given viewer, the "jumpy" presentation of the media clips to the viewer can be unsettling or irritating to the viewer, thereby reducing the overall viewing experience. Third, recommendation engines cannot create content or creatively modify recommended content. Consequently, recommendation engines cannot perform any creative operations to smooth over the "jumpy" presentation of media clips mentioned above.

As the foregoing illustrates, what is needed in the art are more effective techniques for generating media programs for viewers.

SUMMARY

Various embodiments include a computer-implemented method for automatically generating media programs, including determining a media program recipe based on user data, wherein the media program recipe defines at least one structural characteristic associated with a first media program, determining a first set of content options based on the user data, wherein the first set of content options includes one or more media clips, populating the media program recipe based on the first set of content options via execution of one or more media processing functions to generate the first media program, and transmitting the first media program to a first client device for display.

At least one technological advantage of the disclosed techniques relative to the prior art is that the disclosed techniques enable media programs to be automatically generated, which allows personalized media programs to be created that target the specific interests of particular subsets of viewers and individual viewers. Accordingly, the disclosed techniques enable personalized media programs to be generated that are more engaging to viewers compared to media programs that are created using conventional approaches to target broader demographics of viewers.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 5 is an example recipe for generating a personalized media program; according to various embodiments;

DETAILED DESCRIPTION

Figure 1:
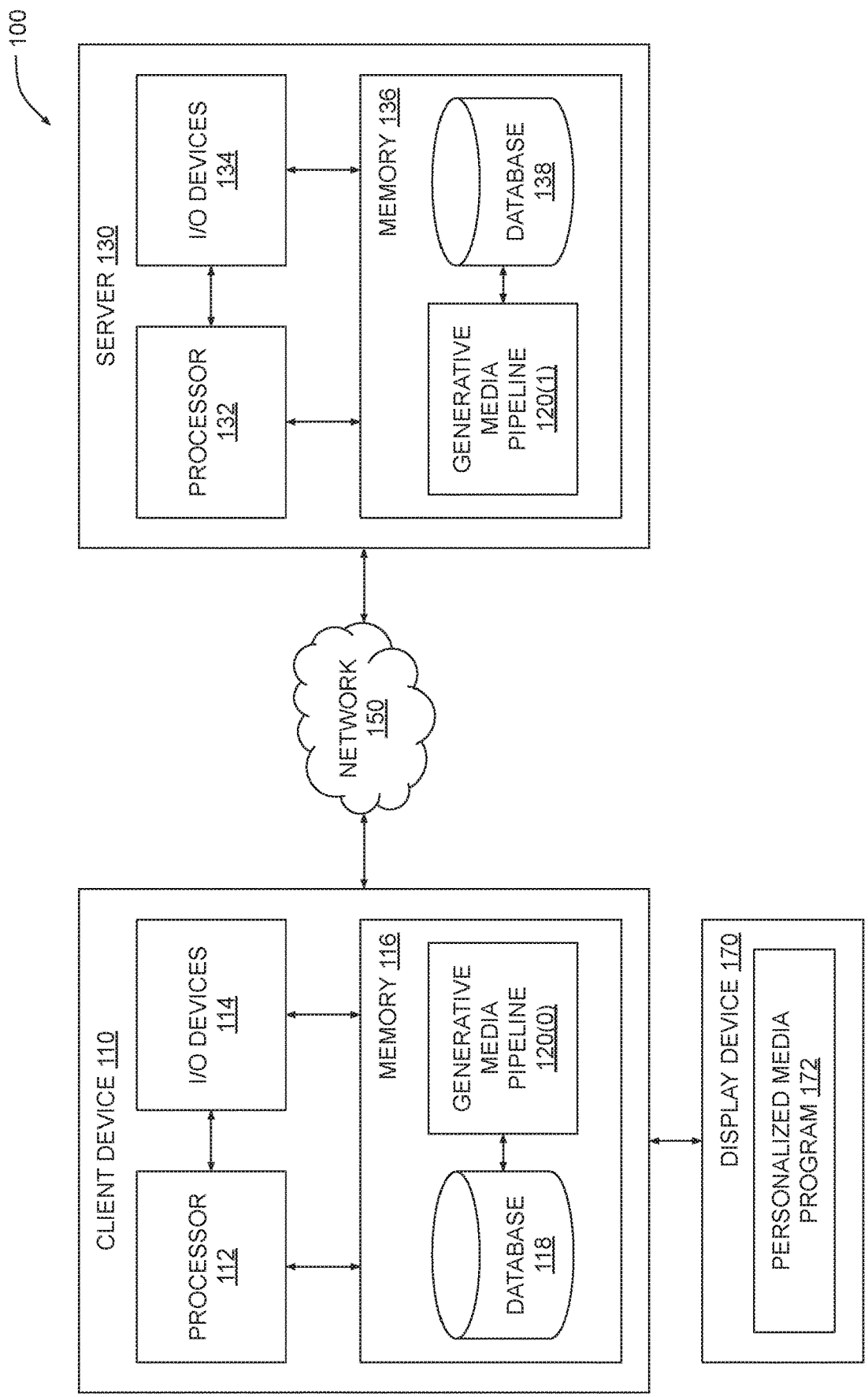
FIG. 1 illustrates a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

As noted above, a typical media production pipeline involves multiple production teams that work in conjunction with one another to create a media program. Different types of production teams may also be needed depending on the type of media program being created. Generally, media production pipelines involve multiple groups of people who work together to perform the many different steps involved with creating a media program. Accordingly, implementing a typical media production pipeline usually involves a large amount of time and effort.

A given media program typically cannot be personalized to appeal to the specific preferences of a single user due to the large amount of time and effort needed to implement a media production pipeline. Instead, media programs are usually created to appeal to a broad demographic of viewers. Viewers within a given demographic usually have different interests and, as a result, may find portions of media programs that target the broad demographic to be uninteresting or irrelevant. To address this issue, recommendation engines have been developed to identify and recommend specific media content that may be relevant to any given user. However, recommendation engines cannot generate media programs that adhere to any sort of logical structure. Second, recommendation engines cannot generate media programs that can be played back seamlessly. Third, recommendation engines cannot create content or creatively modify recommended content to smooth over the presentation of that content.

To address the above issues, various embodiments include a generative media pipeline that automatically creates a personalized media program. The personalized media program is customized to reflect the specific viewing preferences of at least one individual user. The generative media pipeline obtains user data indicating the viewing preferences associated with the user and optionally the viewing context of the user. A recommendation service within the generative media pipeline provides a set of content options that includes various types of media content corresponding to the viewing preferences, such as clips of audio and/or visual content or portions thereof, including any technically feasible portion of 2D and/or 3D graphical elements. A recipe service within the generative media pipeline obtains a recipe that defines the logical structure of the personalized media program. The recipe service can dynamically modify the recipe, as needed, based on the viewing preferences and/or viewing context of the user. The recipe service populates the recipe by executing one or more media processing functions with some or all media content included in the content options. The recipe service thereby generates a personalized media program for the user that is individually tailored to reflect the specific preferences of the user, adheres to a given logical structure, and has a polished appearance.

At least one technical advantage of the disclosed techniques relative to the prior art is that the disclosed techniques enable media programs to be automatically generated, which allows personalized media programs to be created that target the specific interests of particular subsets of viewers and individual viewers. Accordingly, the disclosed techniques enable personalized media programs to be generated that are more engaging to viewers compared to media programs that are created using conventional approaches to target broader demographics of viewers. Thus, the personalized media programs generated with the disclosed techniques are more likely to have higher overall viewership. Further, the personalized media programs generated with the disclosed techniques may be more likely to target niche audiences that are not satisfied with programming directed to larger demographics, potentially allowing new markets to be accessed. In addition, media programs generated by the disclosed techniques adhere to a given logical structure and can be played back seamlessly, unlike sequences of media clips (e.g., a playlist) provided by prior art recommendation engines, thereby increasing the quality of the overall viewing experience. These technical advantages represent one or more technological advancements over prior art approaches.

System Overview

FIG. 1 illustrates a system configured to implement one or more aspects of the various embodiments. As shown, a system 100 includes a client device 110 and a server 130 coupled together via a network 150. Client device 110 is also coupled or connected to a display device 170. In one embodiment, client device 110 and display device 170 may be integrated with one another. Client device 110 or server 130 may be any technically feasible type of computer system, including a desktop computer, a laptop computer, a mobile device, a virtualized instance of a computing device, a distributed and/or cloud-based computer system, a smart display (e.g., a smart television, smart glasses, etc.), and so forth. As a general matter, the disclosed techniques can be implemented in conjunction with any technically feasible type of computing device and/or display technology. Network 150 may be any technically feasible set of interconnected communication links, including a local area network (LAN), wide area network (WAN), the World Wide Web, or the Internet, among others.

As further shown, client device 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs). I/O devices 114 include any technically feasible set of devices configured to perform input and/or output operations, including, for example, a keyboard, a mouse, a speaker, or a touchscreen, among others. In one embodiment, I/O devices 114 may include display device 170. For example, client device 110 could be a smart display configured to perform both processing operations and display operations.

Memory 116 includes any technically feasible storage media configured to store data and software applications, such as, for example, a hard disk, a random-access memory (RAM) module, and a read-only memory (ROM). Memory 116 includes a database 118 and a generative media pipeline 120(0). Database 118 stores various data that is processed by generative media pipeline 120(0). Generative media pipeline 120(0) is a software application that, when executed by processor 112, interoperates with a corresponding software application executing on server 130 to generate personalized media program 172 for display via display device 170.

Server 130 includes a processor 132, I/O devices 134, and a memory 136, coupled together. Processor 132 includes any technically feasible set of hardware units configured to process data and execute software applications, such as one or more CPUs. I/O devices 134 include any technically feasible set of devices configured to perform input and/or output operations, such as a display device, a keyboard, a mouse, or a touchscreen, among others.

Memory 136 includes any technically feasible storage media configured to store data and software applications, such as, for example, a hard disk, a RAM module, and a ROM. Memory 136 includes a database 138 and a generative media pipeline 120(1). Database 138 stores various data that is processed by generative media pipeline 120(1). Generative media pipeline 120(1) is a software application that, when executed by processor 132, interoperates with generative media pipeline 120(0) executing on client device 110 to generate personalized media program 172 for display via display device 170.

As a general matter, databases 118 and 138 represent separate portions of a storage entity that may reside at least partially within a cloud-based infrastructure, as is shown in FIG. 1, or wholly within a local infrastructure. Similarly, generative media pipelines 120(0) and 120(1) represent separate portions of a software entity that may reside and/or execute at least partially within a cloud-based infrastructure, as is shown in FIG. 1, or wholly within a local infrastructure. For simplicity, generative media pipelines 120(0) and 120(1) are collectively referred to hereinafter as generative media pipeline 120, as is shown in FIG. 2.

Generative media pipeline 120 is configured to obtain user data that reflects the viewing preferences and/or viewing context of a particular user of client device 110 or can be used to retrieve the viewing preferences and/or viewing context of the user. Based on the user data, generative media pipeline 120 generates personalized media program 172 to include personalized media content that corresponds to those viewing preferences and/or that viewing context. In this manner, generative media pipeline 120 creates personalized media program 172 to specifically engage the user on an individualized basis. Generative media pipeline 120 implements various techniques for generating personalized media program 172 that are described in greater detail below in conjunction with FIGS. 2-7.

Software Overview

Figure 2:
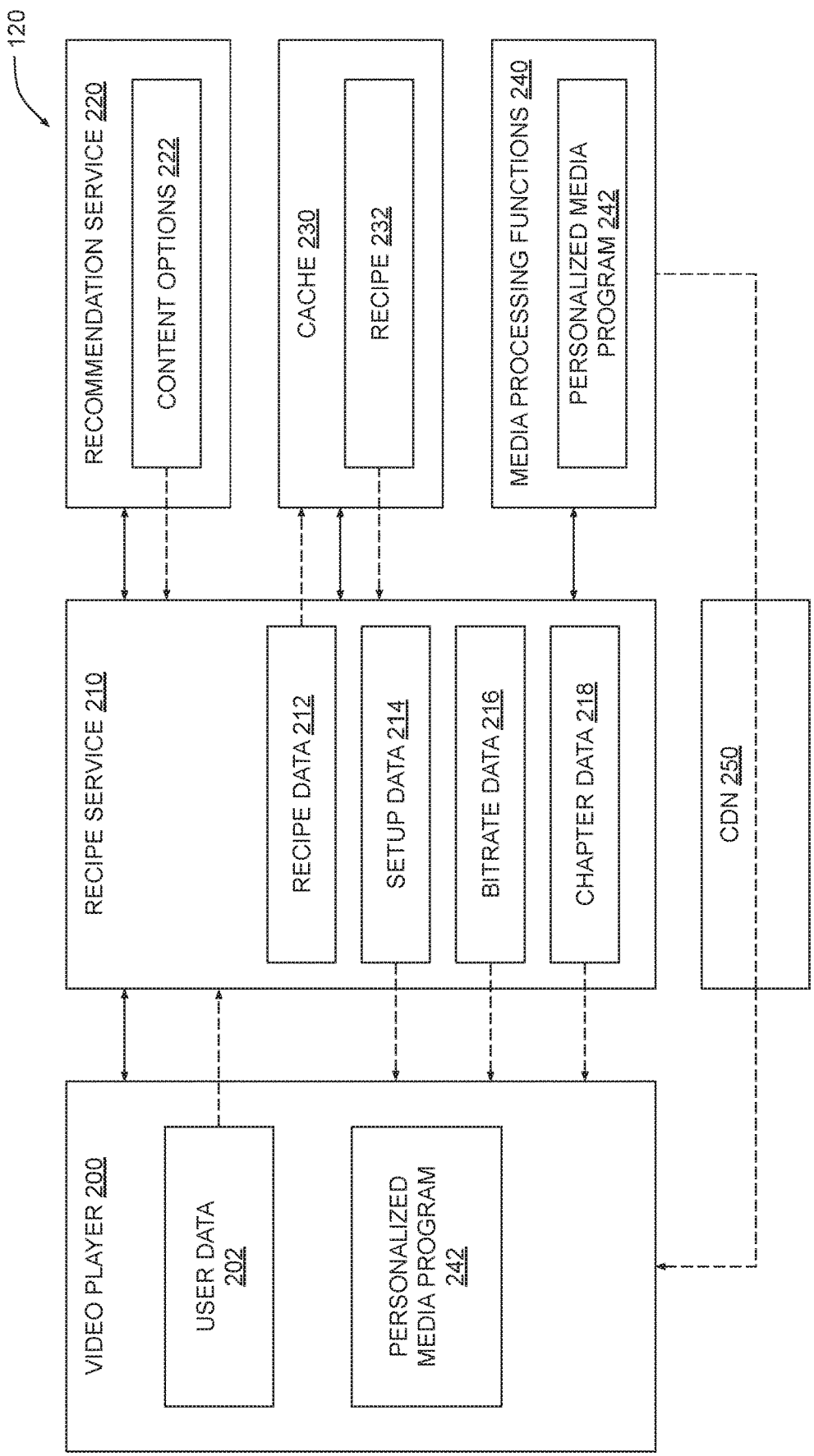
FIG. 2 is a more detailed illustration of the generative media pipeline of FIG. 1, according to various embodiments.

FIG. 2 is a more detailed illustration of the generative media pipeline of FIG. 1, according to various embodiments. As shown, generative media pipeline 120 includes a video player 200, a recipe service 210, a recommendation service 220, a cache 230, media processing functions 240, and content delivery network (CDN) 250. As discussed above in conjunction with FIG. 1, generative media pipeline 120 may be implemented as a distributed software entity. Thus, the various elements of generative media pipeline 120 shown in FIG. 2 may be distributed across multiple different locations. In practice, video player 200 generally resides on client device 110 while the other elements of generative media pipeline 120 reside on one or more instances of server 130.

In operation, video player 200 determines user data 202 associated with the user of client device 110. User data 202 includes information that can be used to identify the user, including a user identifier (ID) or other token that is uniquely assigned to the user. Video player 200 could determine user data 202, for example, based on user login information provided by the user when signing into a streaming media service. User data 202 may also include viewing preferences associated with the user and/or the viewing context of the user and/or client device 110. As referred to herein, the "viewing preferences" of the user indicate categories of media programs that are likely of interest to the user, including types of media programs and/or thematic elements in which the user has previously demonstrated interest (e.g., interviews, game highlights, etc.). Additionally, the "viewing context" of the user indicates the current state of the user and/or client device 110, including the current location and/or current behavior of the user or a device type associated with client device 110. User data 202 may specify the viewing preferences and/or viewing context of the user or, alternatively, some or all of this data can be determined separately based on the user ID set forth in user data 202. User data 202 can also be obtained directly from the user. For example, user data 202 could be obtained based on a user profile within which the user has listed or selected a set of preferences. Video player 200 queries recipe service 210 based on user data 202 in order to obtain personalized media program 172, the generation of which is described in greater detail below.

Based on user data 202, recipe service 210 queries recommendation service 220 to determine content options 222. Content options 222 include various types of media content that are determined to be relevant to the viewing preferences and/or viewing context of the user. Recommendation service 220 determines content options 222 via one or more recommendation engines. In other words, content options 222 may be provided by one or more sources. Content options 222 can include a variety of media assets, including live action or animated video clips, audio clips such as music and/or sound effects, graphical assets, branding assets such as product logos, advertisements, and so forth. Recipe service 210 also queries cache 230 based on user data 202 to obtain recipe 232.

Recipe 232 is a structured dataset that generically defines how a media program is structured. Recipe 232 specifies one or more intervals that can be populated with different media content to produce a unique media program. Each interval specifies the type of media content to be included in the interval and the length of the interval. A given interval can also specify one or more media processing functions 240 to be executed with content options 222 to generate post-processed media content that is included in the given interval. Recipe service 210 processes content options 222 based on recipe 232 to generate recipe data 212. Recipe data 212 includes at least a subset of content options 222 and/or post-processed versions thereof. Based on recipe data 212, recipe service 210 invokes one or more media processing functions 240 to seamlessly stitch together the different elements of recipe data 212 to produce personalized media program 172.

In one embodiment, recipe service 210 may cause a media processing function 240 to encode specific portions of recipe data 212 associated with transitions between intervals in order to create a seamless viewing experience. In another embodiment, recipe service 210 may dynamically modify recipe 232 based on user data 202 to adapt recipe 232 to the current viewing context of the user or to the current behavior of the user relative to personalized media program 172.

Upon creation of personalized media program 172, media processing functions 240 transmit personalized media program 172 to CDN 250 for storage and subsequent delivering to video player 200. In conjunction with the above operations, recipe service 210 generates setup data 214, bitrate data 216, and chapter data 218 based on recipe data 212 and/or recipe 232 in order to facilitate streaming of personalized media program 172.

Setup data 214 defines one or more resource endpoints that video player 200 can use to access the media content included in personalized media program 172, including one or more uniform resource locator (URL) endpoints. Setup data 214 also specifies the resolution and/or bitrate of that media content, among other parameters. In one embodiment, setup data 214 is an .m3u8 file. Bitrate data 216 specifies the bitrate at which personalized media program 172 should be streamed to video player 200 and the particular media files that should be accessed during streaming at that bitrate. Bitrate data 216 can be defined in recipe 232 or determined based on user data 202. Chapter data 218 describes chapter headings associated with the populated intervals of personalized media program 172 and the duration of each such interval. In one embodiment, chapter data 218 may be a .vtt file.

Video player 200 obtains setup data 214, bitrate data 216, and chapter data 218 from recipe service 210 and then initiates streaming of personalized media program 172 via CDN 250. Video player 200 subsequently displays personalized media program 172 to the user via display device 170. Because personalized media program 172 can be uniquely generated on a per-user basis, personalized media program 172 may include media content that is individually relevant to the user and, conversely, not include media content that is likely irrelevant to the user. The various steps involved with generating personalized media program 172 are depicted sequentially in a process diagram that is set forth in FIG. 3.

Figure 3:
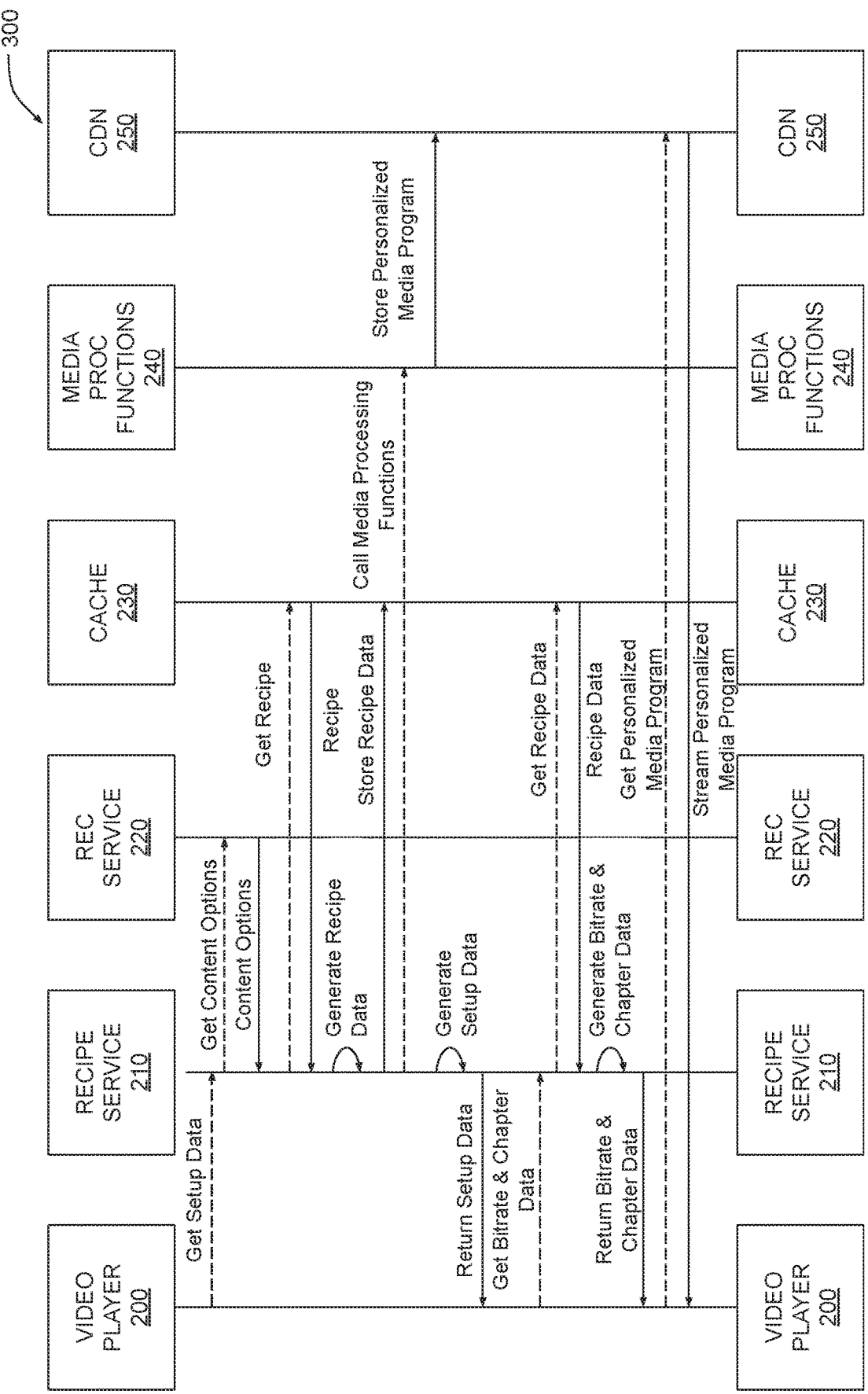
FIG. 3 is a process diagram illustrating how the generative media pipeline of FIG. 1 streams a personalized media program to a client device, according to various embodiments.

FIG. 3 is a process diagram illustrating how the generative media pipeline of FIG. 1 streams a personalized media program to a client device, according to various embodiments. As shown, a process 300 includes a sequence of transactions performed between the various elements of generative media pipeline 120 to generate and stream personalized media program 172.

Video player 200 initially transmits a request for setup data 214 to recipe service 210. The request includes user data 202 that can be used to identify the user and determine the viewing preferences and/or viewing context of the user, as described above in conjunction with FIG. 2. Recipe service 210 requests content options 222 from recommendation (shown as "rec") service 220 and recommendation service 220 transmits content options 222 to recipe service 210 in response. Recipe service 210 obtains recipe 232 from cache 230 and then generates recipe data 212 based on content options 222. Recipe data 212 includes specific content that is to be included in personalized media program 172. Recipe service 210 stores recipe data 212 in cache 230.

Recipe service 210 subsequently calls one or more media processing functions (shown as "proc") functions 240 to process recipe data 212 and generate personalized media program 172. The particular media processing functions 240 that are used to process recipe data 212 are defined in recipe 232. Media processing functions 240 can implement any technically feasible approach to processing any technically feasible type of media data, including editing frames of media data, compositing various types of media data, and encoding media data, among others. As a general matter, the term "media data" may refer to audio data, video data, images such as logos, photos, graphics (static and/or moving), advertisements, text and any other technically feasible audio and/or visual element including 2D and 3D objects. Media data that is processed via one or more media processing functions 240 can be inserted into personalized media program 172. Upon generating personalized media program 172, media processing functions 240 store personalized media program 172 in CDN 250 for subsequent streaming.

In conjunction with generating personalized media program 172, recipe service 210 generates setup data 214 based on recipe 232 and transmits setup data 214 to video player 200. Recipe service 210 also obtains recipe data 212 from cache 230 and generates bitrate data 216 and chapter data 218 based on recipe data 212 and/or recipe 232. Recipe service 210 transmits bitrate data 216 and chapter data 218 to video player 200 as well in order to facilitate the streaming of personalized media program 172. Video player 200 subsequently streams personalized media program 172 to client device 110 for display to the user via display device 170.

Referring generally to FIGS. 2-3, the various processing steps and data transactions described herein may, in some implementations, be performed according to a different sequence and/or performed by different elements than those shown within generative media pipeline 120. In addition, persons familiar with media streaming standards will recognize that various techniques for streaming media content can be applied other than those shown. Recipe 232 can be populated using a variety of different techniques, although one technique for populating recipe 232 is described in greater detail below in conjunction with FIG. 4.

Generating Personalized Media Programs

Figure 4:
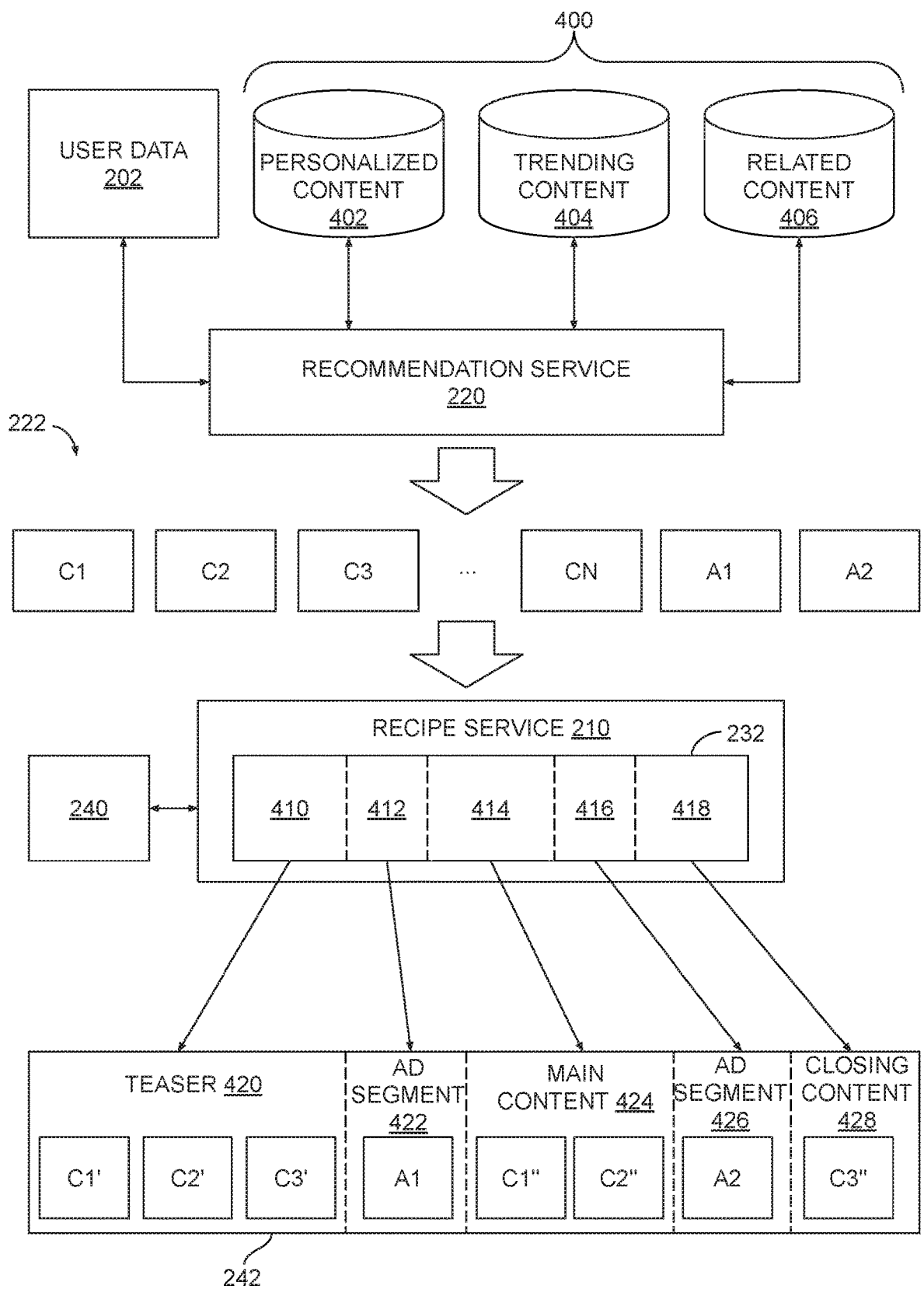
FIG. 4 illustrates how the generative media pipeline of FIG. 1 generates a personalized media program, according to various embodiments.

FIG. 4 illustrates how the generative media pipeline of FIG. 1 generates a personalized media program, according to various embodiments. As shown, recommendation service 220 of FIG. 2 is configured to query various content services 400 based on user data 202 to determine content options 222. Content services 400 include personalized content 402, trending content 404, and related content 406. Personalized content 402 is specifically relevant to the viewing preferences of the user set forth in, or associated with, user data 202. Trending content 404 includes content that is currently popular. Related content 406 includes content that is determined to be associated with personalized content 402 or trending content 404.

Content options 222 can include media content derived from any of content services 400, which may include, as discussed, video content, audio content, visual graphics, sound effects, advertising content, and so forth. In one embodiment, content options 222 may include media content that is derived from different content services 400 based on different proportions specified in recipe 232. For example, content options 222 could include 60% media content derived from personalized content 402, 30% media content derived from trending content 404, and 10% media content derived from related content 406, where these exemplary percentages would be defined in recipe 232. In the example shown, content options 222 include media clips C1 through CN and advertisements A1 and A2. In one embodiment, advertisements are provided by an independent third party advertisement provider.

Recipe service 210 analyzes content options 222 in conjunction with recipe 232 in order to determine how some or all of content options 222 can be processed and/or combined to generate personalized media program 172. Recipe 232 provides a structural framework for generating a wide variety of user-specific personalized media programs that may share common organizational attributes. The exemplary recipe 232 shown includes intervals 410, 412, 414, 416, and 418. A given interval indicates various target attributes for the content options 222 that should be assigned to that interval and optionally indicates one or more media processing functions 240 for processing those content options 222. Recipe service 210 assigns one or more media clips included in content options 222 to a given interval upon determining that the media clip(s) have attributes that best fit the target attributes set forth in the given interval. In this manner, recipe service 210 populates recipe 232 with at least a subset of content options 222 and/or processed versions thereof, to generate personalized media program 172.

The exemplary personalized media program 172 shown includes a teaser 420, an advertisement (ad) segment 422, main content 424, ad segment 426, and closing content 428 that correspond to intervals 410, 412, 414, 416, and 418, respectively. Upon analyzing recipe 232, recipe service 210 determines that media clips C1, C2, and C3 should be used to populate interval 410 and generate teaser 420, advertisement A1 should be used to populate interval 412 and generate ad segment 422, media clips C1 and C2 should be used to populate interval 414 and generate main content 424, advertisement A2 should be used to populate interval 416 and generate ad segment 426, and media clip C3 should be used to populate interval 418 and generate closing content 428. Recipe service 210 may discard any un-assigned media clips. Once some or all content options 222 are assigned in the manner described, recipe service 210 performs additional operations to seamlessly combine those content options.

Recipe service 210 populates teaser 420 by executing a video processing function 240 that generates shortened versions of clips C1, C2, and C3, shown as C1', C2', and C3'. Recipe service 210 may also execute another media processing function 240 to seamlessly stitch together the shortened versions of those clips and add various visual and/or audio effects. Recipe service 210 populates ad segment 422 by introducing an appropriate content break after teaser 420 and then inserting advertisement A1. Recipe service 210 populates main content 424 with modified versions of clips C1 and C2, shown as C1", C2", by executing a media processing function 240 to introduce a transition between these two clips that includes various visual and/or audio effects. Recipe service 210 populates ad segment 426 by introducing an appropriate content break after main content 424 and then inserting advertisement A2. Recipe service 210 populates closing content 428 by executing a media processing function 240 with clip C3 to produce a version of clip C3, shown as C3", that transitions to a credit sequence or other ending sequence.

The techniques described above by way of example can be applied to generate personalized media programs that include any selection of media clips arranged in any order. In the example described above, clips C1 through CN need not all be included in personalized media program 172 and need not appear in the order shown.

In one embodiment, recipe service 210 may modify recipe 232 prior to populating recipe 232 with media content derived from content options 222 in the manner described above. For example, recipe service 210 could determine, based on the viewing context of the user, that the user may not be able to engage with a media program that is longer than a maximum duration. Recipe service 210 could then truncate recipe 232 in order to eliminate one or more intervals, thereby producing a shorter version of personalized media program 172. In the above example, the user may not be able to engage with a media program that is longer than a maximum duration because doing so would cause a maximum daily media consumption cap to be exceeded. User data 202 could be configured (e.g. based on user input) to indicate the maximum daily media consumption cap.

Recipe 232 sets forth various criteria and media processing functions that recipe service 210 uses to select and process media clips when generating personalized media program 172, as described in greater detail below in conjunction with FIG. 5.

Example Recipes and Personalized Media Programs

FIG. 5 is an example of the recipe 232 of FIG. 2, according to various embodiments. As shown, recipe 232 includes intervals 410, 412, 414, 416, and 418, also described above in conjunction with FIG. 4. Each interval includes various metadata that recipe service 210 uses to constrain and/or generate the specific media clips that are assigned to those intervals. In particular, a given interval may include one or more selection criteria that can be applied, as a set of constraints, to filter or restrict the types of media clips assigned to the given interval. In some instances, a given interval indicates one or more media processing functions 240 that should be executed with one or more media clips and optionally other function parameters in order to generate media content for populating the given interval. As referred to herein, a "function parameter" corresponds to an argument that is provided to a media processing function during execution.

In the example shown, interval 410, corresponding to teaser 420, indicates that media processing functions F1 and F2 should be executed using media clips C1, C2, and C3 as function parameters to provide media content associated with interval 410. The function parameters associated with interval 410 can be dynamically updated when recipe service 210 analyzes and populates recipe 232. For example, recipe service 210 could dynamically update the function parameters of interval 410 to reference media clips C1, C2, and C3 upon determining that media clips C1, C2, and C3 are to be included in main content 424. Interval 412, corresponding to ad segment 422, references advertising content stored at URL1. Recipe service 210 can dynamically update URL1 based on the specific advertising content that recommendation service 220 provides to recipe service 210.

Interval 414, corresponding to main content 424, indicates that the media clips included in main content 424 should be selected based on specific selection criteria, including a source, a type, a duration, a sentiment, and an energy level. The "source" criteria set forth in interval 414 indicates that main content 424 should include media clips derived from location 1. The "plot type" criteria set forth in interval 414 indicates that main content 424 should include media clips having a "narrative" plot type. The "duration" criteria set forth in interval 414 indicates that main content 424 should include media clips having a duration between 60 and 180 seconds. The "sentiment" criteria set forth in interval 414 indicates that main content 424 should include media clips having a neutral to positive sentiment level. In one embodiment, the sentiment of a given media clip may be determined using sentiment analysis or other techniques derived from the field of Natural Language Processing. The "energy" criteria set forth in interval 414 indicates that main content 424 should include media clips having a mid to high energy level. In one embodiment, the energy of a given media clip may be determined based on how quickly the audio or video content of the given media clip changes over time. During recipe population, recipe service 210 analyzes content options 222 and then determines that media clips C1 and C2 best match the selection criteria set forth in interval 414. Recipe service 210 can then update the function parameters set forth in interval 410 to reference media clips C1 and C2, thereby allowing portions of those media clips to be included in teaser 420.

Interval 414 also indicates that media processing functions F3 and F4 should be executed with function parameters C1, C2, P1, and P2 to provide content that is assigned to interval 414. During recipe population, recipe service 210 executes media processing functions F3 and F4 with media clips C1 and C2 and function parameters P1 and P2 upon selecting media clips C1 and C2 in the manner described above. Function parameters P1 and P2 can be statically defined or dynamically updated during analysis of recipe 232.

Interval 416, corresponding to ad segment 426, references advertising content stored at URL2. As with interval 412, recipe service 210 can dynamically update URL2 based on the specific advertising content that recommendation service 220 provides to recipe service 210.

Interval 418, corresponding to closing content 428, indicates that the media clips included in closing content 428 should be selected to have a particular source, type, duration, sentiment, and energy level, similar to interval 414. The "source" criteria set forth in interval 418 indicates that closing content 428 should include media clips derived from location 2. The "plot type" criteria set forth in interval 418 indicates that closing content 428 should include media clips that generally provide a conclusion. The "duration" criteria set forth in interval 418 indicates that closing content 428 should include media clips having a duration between 60 and 120 seconds. The "sentiment" criteria set forth in interval 418 indicates that closing content 428 should include media clips having a positive sentiment level. The "energy" criteria set forth in interval 418 indicates that closing content 428 should include media clips having a low energy level. During recipe population, recipe service 210 analyzes content options 222 and then determines that media clip C3 best matches the selection criteria set forth in interval 418. Recipe service 210 can then update the function parameters set forth in interval 412 to reference media clip C3, thereby allowing portions of that media clip to be included in teaser 420.

Interval 418 also indicates that media processing function F5 should be executed with clip C3 and function parameter P3 to provide content that is assigned to interval 418. During recipe population, recipe service executes media processing function F5 with media clip C3 and function parameter P3 upon selecting media clip C3 in the manner described above. Function parameter P3 can be statically defined or dynamically updated during analysis of recipe 232.

In one embodiment, recipe service 210 may apply the selection criteria discussed herein as constraints in order to restrict the specific types of media clips that can be assigned to any given interval. For example, recipe service 210 could implement a constraint on the types of media clips that could be included in a given interval by filtering the set of possible media clips based on one or more selection criteria. Persons skilled in the art will understand that the specific media processing functions, parameters, and selection criteria discussed above are provided for exemplary purposes and not meant to limit the scope of the present embodiments. In one embodiment, any given media clip may be tagged with one or more tags corresponding to various selection criteria, thereby allowing recipe service 210 to filter media clips based on corresponding tags.

In one embodiment, a given interval may specify multiple media assets that should be combined via execution of one or more media processing functions. For example, a given interval could indicate that a particular image, such as a branding asset, should be composited with a media clip assigned to that interval. Alternatively, a given interval could indicate that a particular audio track, such as a specific sound effect, should be associated with a media clip assigned to that interval. In another embodiment, a given recipe may be generated to reflect a particular style associated with a given pre-existing media program. For example, a recipe could be generated based on a collection of movies created by a particular director, thereby allowing media programs to be generated that may include thematic and/or structural similarities common to movies created by that director.

In another embodiment, a given interval may be populated with media content based on how the user responds to media content included in another interval of the same personalized media program or a different personalized media program. For example, suppose the user skips through the media content presented in a given interval. Subsequently, related content could be withheld from populating another interval. In another example, suppose the user watches an entire media clip devoted to a newly suggested topic. Subsequent intervals could be populated with media content related to that topic. This approach allows personalized media programs to be dynamically adapted in real-time to the behavior of the user.

In practice, recipe 232 can be defined using a variety of different human-readable formats and/or machine-readable data structures, including JavaScript Object Notation (JSON), YAML ain't markup language (YAML), extensible markup language (XML), or hypertext markup language (HTML), among others. Recipes can also include any technically feasible type of criteria for filtering and assigning content options to intervals. Using recipes structured in the manner described, recipe service 210 can generate personalized media programs that cater to a wide variety of different interests and contexts.

Any two personalized media programs that are generated from the same recipe can have certain common structural characteristics. A given structural characteristic generally corresponds to a logical arrangement or pattern of elements associated with a given recipe. Structural characteristics may include one or more structural features that relate to various attributes of the structure of a given recipe, including attributes of the elements that make up the given recipe. Any two personalized media programs that are generated from the same recipe may also have specific differences that reflect variations in viewing preferences and viewing context between two different users, as described by way of example below in conjunction with FIG. 6.

Figure 6:
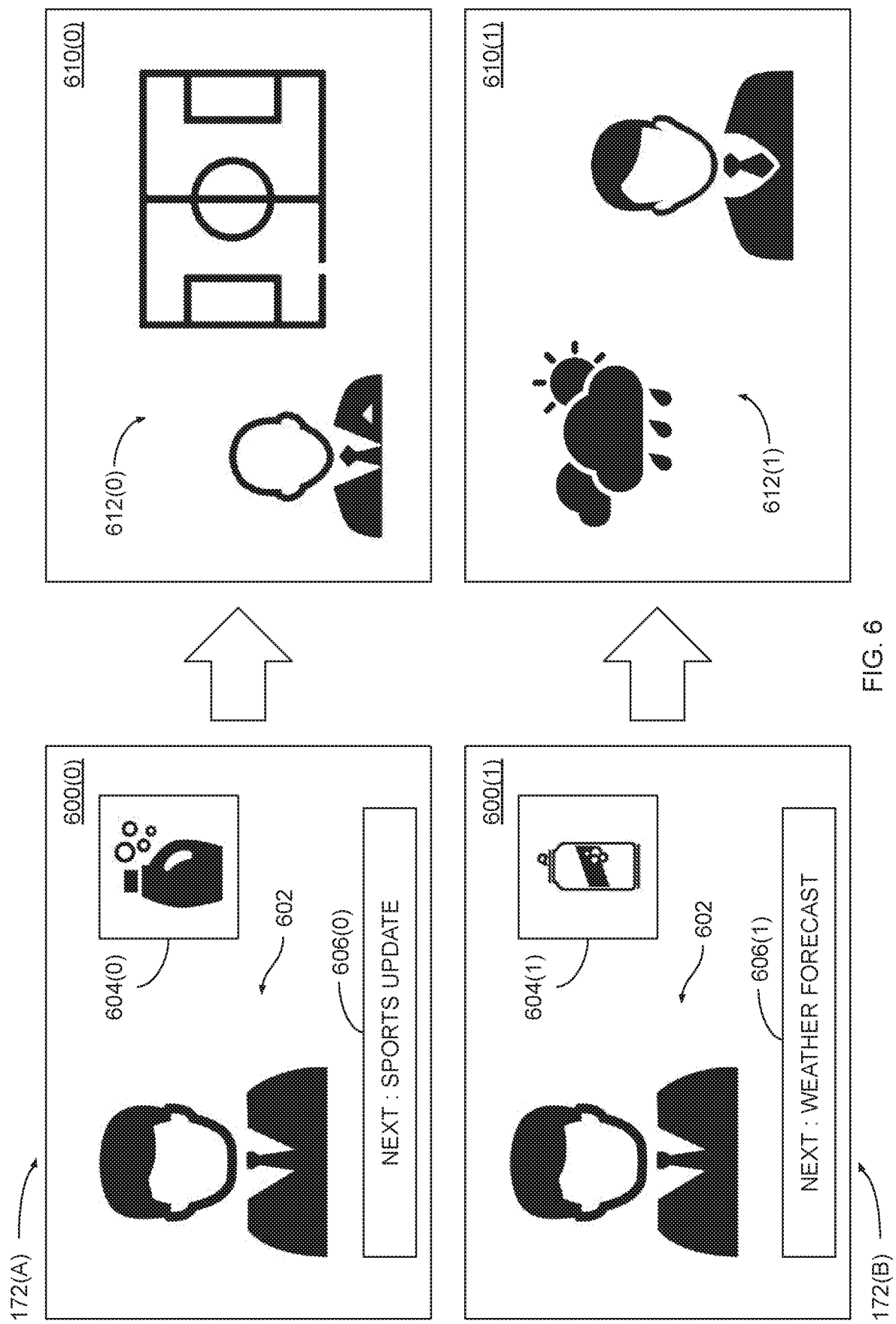
FIG. 6 sets forth examples of different personalized media programs generated using the same recipe, according to various embodiments.

FIG. 6 sets forth examples of different personalized media programs generated using the same recipe, according to various embodiments. As shown, personalized media program 172(A) includes segments 600(0) and 610(0) and personalized media program 172(B) includes segments 600(1) and 610(1). Generative media pipeline 120 generates personalized media programs 172(A) and 172(B) based on the same recipe but for two different users. The viewing preferences and/or viewing context of those two users may have some commonalities, but in this example the viewing preferences and/or viewing context of the two users are not the same. As such, personalized media programs 172(A) and 172(B) are structured similarly and have some, but not all, media content in common with one another.

In particular, segments 600(0) and 600(1) both include media clip 602. In this example, media clip 602 is an introductory segment. However, segments 600(0) and 600(1) include different advertisements 604(0) and 604(1), respectively, and different banners 606(0) and 606(1), respectively. Advertisements 604(0) and 604(1) are different because recommendation service 220 provides different advertising content to recipe service 210 during recipe population. Each advertisement 604(0) and 604(1) generally reflects the viewing preferences and/or viewing context of the corresponding user. Similarly, banners 606(0) and 606(1) are different because recipe service 210 executes a video processing function 240 during recipe population that composites different information with media clip 602 to describe the subsequent segments 610.

Segments 610 include different media clips 612. In particular, segment 610(0) includes media clip 612(0) and segment 610(1) includes media clip 612(1). In this example, media clip 612(0) is a sports update, as also indicated in banner 606(0), while media clip 612(1) is a weather report, as also indicated in banner 606(1). Media clips 612(0) and 612(1) are different because recommendation service 220 provides different content options 222 for different users and recipe service 210 populates the recipe differently for different users.

Generative media pipeline 120 performs the techniques described above by way of example in order to generate and stream different versions of media programs that can be personalized on a per-user basis. Accordingly, generative media pipeline 120 can reduce the extent to which media programs include content that may be uninteresting or irrelevant to users. Various operations performed by generative media pipeline 120 when generating a personalized media program 172 are described in greater detail below in conjunction with FIG. 7.

Procedure for Generating a Personalized Media Program

Figure 7:
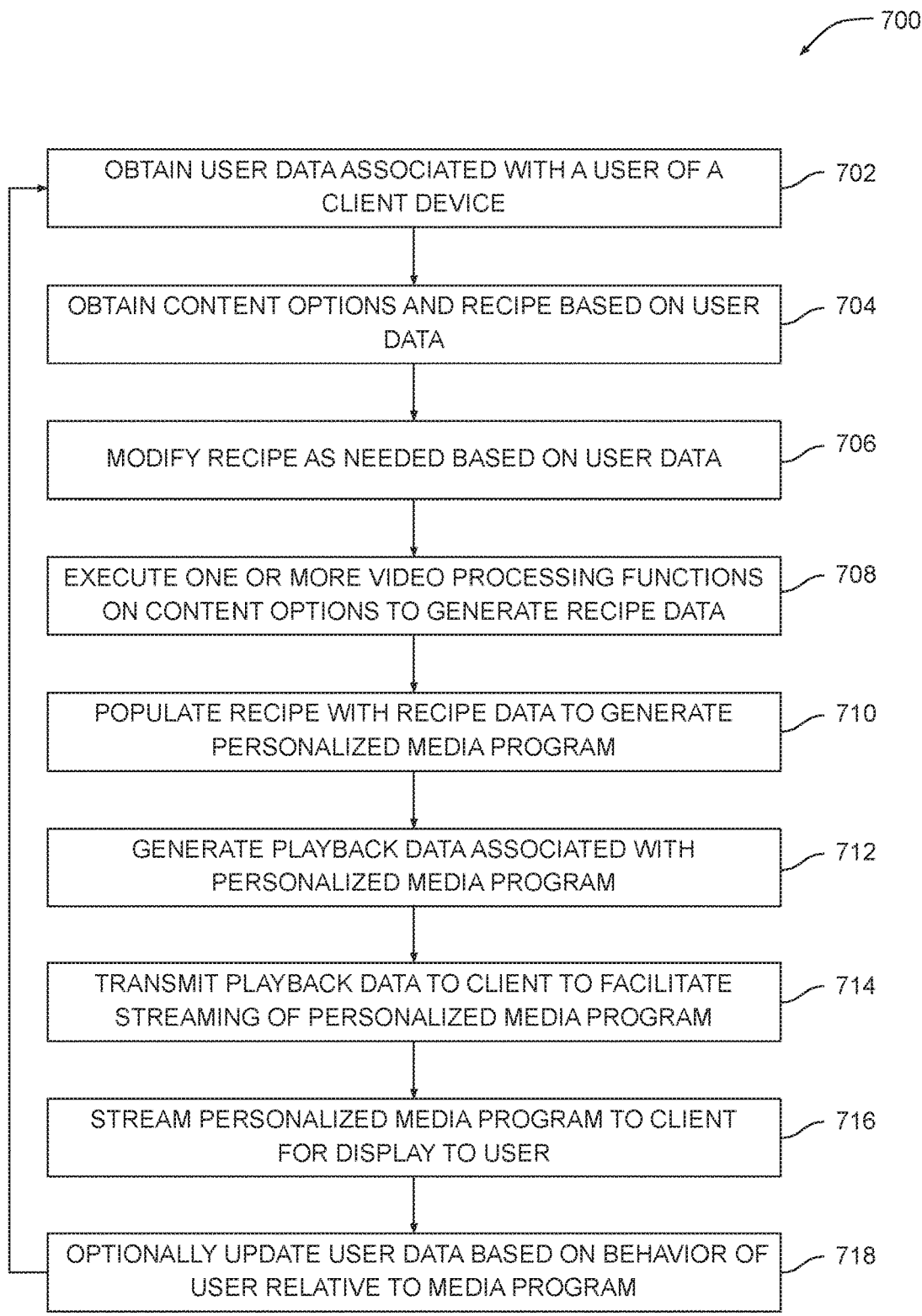
FIG. 7 is a flow diagram of method steps for generating a personalized media program, according to various embodiments.

FIG. 7 is a flow diagram of method steps for generating a personalized media program, according to various embodiments. Although the method steps are described in conjunction with the systems of FIGS. 1-6, persons skilled in the art will understand that any system configured to perform the method steps in any order falls within the scope of the present embodiments.

As shown, a method 700 begins at step 702, where recipe service 210 within generative media pipeline 120 obtains user data 202 that identifies and/or characterizes the viewing preferences and/or viewing context associated with a user of client device 110. User data 202 could include, for example, a user ID corresponding to a user profile that includes the viewing preferences and/or viewing preferences associated with the user. Video player 200 generally provides user data 202 to recipe service 210 and could obtain user data 202, for example, based on login information associated with the user.

At step 704, recipe service 210 obtains content options 222 and recipe 232 based on user data 202 obtained at step 702. Recipe service 210 obtains content options 222 from recommendation service 220. Recommendation service 220, in turn, obtains content options 222 from content services 400 shown in FIG. 4, which include personalized content 402, trending content 404, and related content 406, based on the viewing preferences of the user. Recommendation service 220 can obtain content options 222 using any technically feasible type of recommendation engine. Recipe 232 may correspond to a particular type of media program the user selects or can be automatically selected based on the viewing preferences and/or viewing context of the user.

At step 706, recipe service 210 modifies recipe 232 as needed based on user data 202 For example, recipe service 210 could determine that populating recipe 232 would result in a media program that is too long for the amount of viewing time the user likely has available. In response, recipe service 210 could modify recipe 232 to remove certain elements, thereby creating a recipe that, when populated, results in a media program that is similar to the amount of viewing time the user likely has available. In one embodiment, at step 706, recipe service 210 may select between different recipes 232 based on user data 202.

At step 708, recipe service 210 executes one or more media processing functions 240 specified in recipe 232 with some or all content options 222 to generate recipe data 212. A given media processing function 240 generally includes program code that performs one or more video and/or audio processing functions, including editing, compositing, and encoding operations, among others. Recipe service 210 processes media clips and other content included in content options 222 by executing media processing function(s) 240 that are indicated in recipe 232, as shown in FIG. 5. Recipe service 210 may filter content options 222 prior to executing media processing function(s) 240 in order to identify the most relevant subset of content options 222 that should be assigned to intervals within recipe 232.

At step 710, recipe service 210 populates recipe 232 with recipe data 212 to generate personalized media program 172. In doing so, recipe service 210 seamlessly stitches together one or more media clips included in recipe data 212 in order to create personalized media program 172. Personalized media program 172 is uniquely generated to engage a specific user or group of users. Recipe service 210 stores personalized media program 172 in CDN 250 for subsequent streaming operations.

At step 712, recipe service 210 generates playback data associated with personalized media program 172, including setup data 214, bitrate data 216, and chapter data 218. In one embodiment, video player 200 may be configured to stream media content according to the HTML5 media standard. As such, setup data 215 and bitrate data 216 may be .m3u8 files and chapter data 218 may be a .vtt file.

At step 714, recipe service 210 transmits the playback data generated at step 712 to client device 110 to facilitate streaming of personalized media program 172. Video player 200 is configured to process the playback data in order to stream personalized media program 172 from CDN 250.

At step 716, video player 200 streams personalized media program 172 to client device 110 for display to the user via display device 170. In one embodiment, client device 110 may be a smart display that includes display device 170. Persons skilled in the art will understand that any technically feasible display technology may be used to implement display device 170.

At step 718, video player 200 optionally updates user data 202 based on the behavior of the user relative to personalized media program 172. For example, video player 200 could identify when the user skips a specific portion of personalized media program 172, and then update user data 202 to indicate various metadata associated with that specific portion. Similarly, video player 200 could determine when the user re-watches a particular portion of personalized media program 172, and then update user data 202 to indicate various metadata associated with that particular portion. In this manner, user data 202 can be updated in real time to reflect whether the user expresses interest in various portions of the personalized media program 172. Video player 200 can be configured to detect any technically feasible type of user behavior, although in practice video player 200 detects various types of user behavior based on user interactions with video player 200, client device 110, and/or display screen 170. Upon updating user data 202 in the manner described, video player 200 may also transmit the updated version of user data 202 to an external location that stores various account-oriented information associated with the user. Based on the updated version of user data 202, the method 700 can repeat in order to allow recipe service 210 to generate additional personalized media programs that, in some cases, more closely reflect the interests of the user.

In sum, a generative media pipeline automatically creates a personalized media program. The personalized media program is customized to reflect the specific viewing preferences of at least one individual user. The generative media pipeline obtains user data indicating the viewing preferences associated with the user and optionally the viewing context of the user. A recommendation service within the generative media pipeline provides a set of content options that includes various types of media content corresponding to the viewing preferences, such as clips of audio and/or visual content. A recipe service within the generative media pipeline obtains a recipe that defines the logical structure of the personalized media program. The recipe service can dynamically modify the recipe, as needed, based on the viewing preferences and/or viewing context of the user. The recipe service populates the recipe by executing one or more video processing functions with some or all media content included in the content options. The recipe service thereby generates a personalized media program for the user that is individually tailored to reflect the specific preferences of the user, adheres to a given logical structure, and has a polished appearance.

At least one technical advantage of the disclosed techniques relative to the prior art is that the disclosed techniques enable media programs to be automatically generated, which allows personalized media programs to be created that target the specific interests of particular subsets of viewers and individual viewers. Accordingly, the disclosed techniques enable personalized media programs to be generated that are more engaging to viewers compared to media programs that are created using conventional approaches to target broader demographics of viewers. Thus, the personalized media programs generated with the disclosed techniques are more likely to have higher overall viewership. Further, the personalized media programs generated with the disclosed techniques may be more likely to target niche audiences that are not satisfied with programming directed to larger demographics, potentially allowing new markets to be accessed. In addition, media programs generated by the disclosed techniques adhere to a given logical structure and can be played back seamlessly, unlike sequences of media clips provided by prior art recommendation engines, thereby increasing the quality of the overall viewing experience. These technical advantages represent one or more technological advancements over prior art approaches.

1. Some embodiments include a computer-implemented method for automatically generating media programs, the method comprising determining a media program recipe based on user data, wherein the media program recipe defines at least one structural characteristic associated with a first media program, determining a first set of content options based on the user data, wherein the first set of content options includes one or more media clips, populating the media program recipe based on the first set of content options via execution of one or more media processing functions to generate the first media program, and transmitting the first media program to a first client device for display.

2. The computer-implemented method of clause 1, wherein the media program recipe indicates a first interval associated with the first media program, and wherein populating the media program recipe comprises inserting a first media clip derived from the first set of content options into the first interval based on at least one constraint associated with the first interval.

3. The computer-implemented method of any of clauses 1-2, wherein the media program recipe indicates a first media processing function included in the one or more media processing functions, and wherein populating the media program recipe comprises executing the first media processing function based on a first media clip derived from the first set of content options to generate a second video clip, and inserting the second media clip into a first interval associated with the first media program.

4. The computer-implemented method of any of clauses 1-3, wherein executing the first media processing function based on the first media clip comprises at least one of compositing a visual graphic with a video portion of the first media clip or compositing an audio sample with an audio portion of the first media clip.

5. The computer-implemented method of any of clauses 1-4, wherein populating the media program recipe comprises encoding at least a portion of a first media clip derived from the first set of content options and at least a portion of a second media clip derived from the first set of content options to generate a first portion of encoded media content, and inserting the first portion of encoded media content into a first interval associated with the first media program.

6. The computer-implemented method of any of clauses 1-5, wherein the user data comprises a set of viewing preferences that indicates at least one category of media content.

7. The computer-implemented method of any of clauses 1-6, wherein the user data comprises a viewing context that indicates at least one of a location where the first client device resides or a device type corresponding to the first client device.

8. The computer-implemented method of any of clauses 1-7, wherein the user data comprises a user identifier that corresponds to at least one of a set of viewing preferences associated with a first user or a viewing context associated with the first user.

9. The computer-implemented method of any of clauses 1-8, further comprising modifying the media program recipe based on the user data to adjust a duration of the first media program.

10. The computer-implemented method of any of clauses 1-9, further comprising populating the media program recipe based on a second set of content options via execution of the one or more media processing functions to generate a second media program different from the first media program, and transmitting the second media program to a second client device for display.

11. Some embodiments include a non-transitory computer-readable medium storing program instructions that, when executed by a processor, cause the processor to automatically generate media programs by performing the steps of determining a media program recipe based on user data, wherein the media program recipe defines at least one structural characteristic associated with a first media program, determining a first set of content options based on the user data, wherein the first set of content options includes one or more media clips, populating the media program recipe based on the first set of content options via execution of one or more media processing functions to generate the first media program, and transmitting the first media program to a first client device for display.

12. The non-transitory computer-readable medium of clause 11, wherein the media program recipe indicates a first interval associated with the first media program, and wherein the step of populating the media program recipe comprises inserting a first media clip derived from the first set of content options into the first interval based on at least one constraint associated with the first interval.

13. The non-transitory computer-readable medium of any of clauses 11-12, wherein the media program recipe indicates a first media processing function included in the one or more media processing functions, and wherein the step of populating the media program recipe comprises executing the first media processing function based on a first media clip derived from the first set of content options to generate a second video clip, and inserting the second media clip into a first interval associated with the first media program.

14. The non-transitory computer-readable medium of any of clauses 11-13, wherein executing the first media processing function based on the first media clip comprises at least one of compositing a visual graphic with a video portion of the first media clip or compositing an audio sample with an audio portion of the first media clip.

15. The non-transitory computer-readable medium of any of clauses 11-14, wherein the step of populating the media program recipe comprises encoding at least a portion of a first media clip derived from the first set of content options and at least a portion of a second media clip derived from the first set of content options to generate a first portion of encoded media content, and inserting the first portion of encoded media content into a first interval associated with the first media program.

16. The non-transitory computer-readable medium of any of clauses 11-15, wherein the user data comprises a user identifier that corresponds to at least one of a set of viewing preferences associated with a first user or a viewing context associated with the first user.

17. The non-transitory computer-readable medium of any of clauses 11-16, further comprising the step of modifying the media program recipe based on the user data to decrease the duration of the first media program.

18. The non-transitory computer-readable medium of any of clauses 11-17, further comprising the steps of populating the media program recipe based on a second set of content options to generate a second media program, and transmitting the second media program to a second client device for display, wherein the second media program includes a first media clip that is also included in the first media program and a second media clip that is not included in the first media program.

19. The non-transitory computer-readable medium of any of clauses 11-18, wherein the recipe indicates a thematic style according to which the first media program is generated.

20. Some embodiments include a system, comprising a memory storing a software application, and a processor that, when executing the software application, is configured to perform the steps of determining a media program recipe based on user data, wherein the media program recipe defines at least one structural characteristic associated with a first media program, determining a first set of content options based on the user data, wherein the first set of content options includes one or more media clips, populating the media program recipe based on the first set of content options via execution of one or more media processing functions to generate the first media program, and transmitting the first media program to a first client device for display.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for automatically generating media programs, the method comprising:
   determining a media program recipe based on user data, wherein the media program recipe specifies one or more intervals to be populated with media content associated with a first media program, and wherein a first interval included in the one or more intervals specifies one or more media processing functions to be executed in order to generate a first subset of the media content for populating the first interval;
   determining a first plurality of content options based on the user data, wherein the first plurality of content options includes one or more media clips;
   combining, based on the media program recipe and via execution of the one or more media processing functions that edit one or more frames of media data according to one or more function parameters included in the media program recipe, the one or more media clips to generate the first media program; and
   transmitting the first media program to a first client device for display.

2. The computer-implemented method of claim 1, wherein combining the one or more media clips to generate the first media program comprises stitching a first media clip derived from the first plurality of content options and a second media clip derived from the first plurality of content options to create the first media program.

3. The computer-implemented method of claim 1, wherein combining the one or more media clips to generate the first media program comprises:
   executing a first media processing function based on a first media clip derived from the first plurality of content options to generate a second media clip; and
   inserting the second media clip into the first interval.

4. The computer-implemented method of claim 1, further comprising combining, via execution of one or more additional media processing functions, the one or more media clips to generate the first media program by performing at least one of compositing a visual graphic with a video portion of a first media clip, compositing audio data with the video portion of the first media clip, compositing the audio data with an audio portion of the first media clip, or compositing the audio data with the audio portion of the first media clip.

5. The computer-implemented method of claim 1, further comprising combining, via execution of one or more additional media processing functions, the one or more media clips to generate the first media program by:
   encoding at least a portion of a first media clip derived from the first plurality of content options and at least a portion of a second media clip derived from the first plurality of content options to generate a first portion of encoded media content; and
   inserting the first portion of encoded media content into the first interval.

6. The computer-implemented method of claim 1, wherein the user data comprises a set of viewing preferences that indicates at least one category of the media content.

7. The computer-implemented method of claim 1, wherein the user data comprises a viewing context that indicates at least one of a location where the first client device is located or a device type corresponding to the first client device.

8. The computer-implemented method of claim 1, wherein the user data comprises a user identifier that corresponds to at least one of a set of viewing preferences associated with a first user or a viewing context associated with the first user.

9. The computer-implemented method of claim 1, further comprising modifying the media program recipe based on the user data to adjust a duration of the first media program.

10. The computer-implemented method of claim 1, further comprising:
    populating the media program recipe based on a second plurality of content options via execution of the one or more media processing functions to generate a second media program different from the first media program; and
    transmitting the second media program to a second client device for display.

11. The computer-implemented method of claim 1, further comprising:
    identifying a first user interaction with the first client device that corresponds to a first portion of the first media program;
    updating the user data based on the first user interaction to generate an updated version of the user data that includes metadata associated with the first portion of the first media program;
    modifying the media program recipe based on the updated version of the user data;

generating a second media program based on the updated version of the user data; and transmitting the second media program to the first client device for display.

12. A non-transitory computer-readable medium storing program instructions that, when executed by a processor, cause the processor to automatically generate media programs by performing the steps of:

determining a media program recipe based on user data, wherein the media program recipe specifies one or more intervals to be populated with media content associated with a first media program, and wherein a first interval included in the one or more intervals specifies one or more media processing functions to be executed in order to generate a first subset of the media content for populating the first interval;

determining a first plurality of content options based on the user data, wherein the first plurality of content options includes one or more media clips;

combining, based on the media program recipe and via execution of the one or more media processing functions that edit one or more frames of media data according to one or more function parameters included in the media program recipe, the one or more media clips to generate the first media program; and transmitting the first media program to a first client device for display.

13. The non-transitory computer-readable medium of claim 12, wherein the step of combining the one or more media clips to generate the first media program comprises inserting a first media clip derived from the first plurality of content options into the first interval based on at least one constraint associated with the first interval.

14. The non-transitory computer-readable medium of claim 12, wherein the step of combining the one or more media clips to generate the first media program comprises:

executing a first media processing function based on a first media clip derived from the first plurality of content options to generate a second media clip; and inserting the second media clip into the first interval.

15. The non-transitory computer-readable medium of claim 12, wherein the instructions further cause the processor to perform the step of combining, via execution of one or more additional media processing functions, the one or more media clips to generate the first media program by performing at least one of compositing a visual graphic with a video portion of a first media clip, compositing audio data with the video portion of the first media clip, compositing the audio data with an audio portion of the first media clip, or compositing the audio data with the audio portion of the first media clip.

16. The non-transitory computer-readable medium of claim 12, wherein the instructions further cause the processor to perform the step of combining, via execution of one or more additional media processing functions, the one or more media clips to generate the first media program by:

encoding at least a portion of a first media clip derived from the first plurality of content options and at least a portion of a second media clip derived from the first plurality of content options to generate a first portion of encoded media content; and inserting the first portion of encoded media content into a second interval associated with the first media program.

17. The non-transitory computer-readable medium of claim 12, wherein the user data comprises a user identifier that corresponds to at least one of a set of viewing preferences associated with a first user or a viewing context associated with the first user.

18. The non-transitory computer-readable medium of claim 12, wherein the instructions further cause the processor to perform the step of modifying the media program recipe based on the user data to decrease a duration of the first media program.

19. The non-transitory computer-readable medium of claim 12, wherein the instructions further cause the processor to perform the steps of:

populating the media program recipe based on a second plurality of content options to generate a second media program different from the first media program; and transmitting the second media program to a second client device for display, wherein the second media program includes a first media clip that is also included in the first media program and a second media clip that is not included in the first media program.

20. The non-transitory computer-readable medium of claim 12, wherein the media program recipe indicates a thematic style according to which the first media program is generated.

21. The non-transitory computer-readable medium of claim 12, wherein the instructions further cause the processor to perform the steps of:

identifying a first user interaction with the first client device that corresponds to a first portion of the first media program;

updating the user data based on the first user interaction to generate an updated version of the user data that includes metadata associated with the first portion of the first media program;

modifying the media program recipe based on the updated version of the user data;

generating a second media program based on the updated version of the user data; and transmitting the second media program to the first client device for display.

22. A system, comprising:

a memory storing a software application, and a processor that, when executing the software application, is configured to perform the steps of:

determining a media program recipe based on user data, wherein the media program recipe specifies one or more intervals to be populated with media content associated with a first media program, and wherein a first interval included in the one or more intervals specifies one or more media processing functions to be executed in order to generate a first subset of the media content for populating the first interval;

determining a first plurality of content options based on the user data, wherein the first plurality of content options includes one or more media clips;

combining, based on the media program recipe and via execution of the one or more media processing functions that edit one or more frames of media data according to one or more function parameters included in the media program recipe, the one or more media clips to generate the first media program; and transmitting the first media program to a first client device for display.

* * * * *